United States Patent [19]

Sadhukhan

[11] 4,238,296

[45] Dec. 9, 1980

[54] PROCESS OF DESALINATION BY DIRECT CONTACT HEAT TRANSFER

[75] Inventor: Pasupati Sadhukhan, La Verne, Calif.

[73] Assignee: Occidental Research Corporation, Irvine, Calif.

[21] Appl. No.: 907,143

[22] Filed: May 17, 1978

[51] Int. Cl.³ .............................................. C02B 1/06
[52] U.S. Cl. ..................................... 203/100; 203/23; 203/71; 203/88; 202/173; 202/177; 202/180; 202/185 A; 202/234; 202/175
[58] Field of Search ............. 203/11, 10, 100, DIG. 7, 203/91, 88, 71, 23; 202/185 A, 234, 173, 174, 177, 180, 158, 175

[56] References Cited

U.S. PATENT DOCUMENTS

| | | | |
|---|---|---|---|
| 3,219,554 | 11/1965 | Woodward | 203/100 DC UX |
| 3,232,847 | 2/1966 | Hoff | 203/100 DC UX |
| 3,236,747 | 2/1966 | Margiloff | 203/100 X |
| 3,298,932 | 1/1967 | Bauer | 203/100 X |
| 3,392,089 | 7/1968 | Guptill et al. | 203/100 X |
| 3,640,850 | 2/1972 | Smith | 203/100 X |
| 3,741,878 | 6/1973 | Osdor | 202/173 |
| 3,856,631 | 12/1974 | Smith | 203/100 X |
| 4,009,082 | 2/1977 | Smith | 203/100 X |

Primary Examiner—Wilbur L. Bascomb, Jr.
Attorney, Agent, or Firm—Max Geldin; William G. Lane; William N. Patrick

[57] ABSTRACT

A process and system for obtaining fresh water from salt water such as sea water, by direct contact heat transfer using staged evaporator-condenser units operating with a low boiling water-immiscible liquid hydrocarbon. Each stage comprises a closed vessel divided into two compartments, an evaporator and a condenser, by a bubble cap tray similar in construction to those used in distillation. Relatively hot fresh water is introduced into the liquid hydrocarbon contained in the lower compartment of each stage, causing boiling of the hydrocarbon at a temperature difference of 2°–4° F. Hydrocarbon vapors pass from the evaporator compartment through the bubble caps to the upper condenser compartment where they are condensed in contact with a colder saline stream, and the condensed hydrocarbon is returned to the lower compartment. The heated saline stream is flash evaporated and the vapors are condensed in direct contact with recycled fresh water from the evaporator compartments, and a portion of this combined stream is taken off as product, the remainder of the combined stream being further heated and reintroduced into the evaporator compartments of the staged units. Sea water feed is introduced into the condenser compartment of the last stage and passes into the respective condenser compartments of each of the preceding stages, and is further heated therein in each stage, and the hot fresh water introduced into the evaporator compartment of the first stage is passed through the evaporator compartments of each successive stage and is further cooled in each successive stage.

16 Claims, 4 Drawing Figures

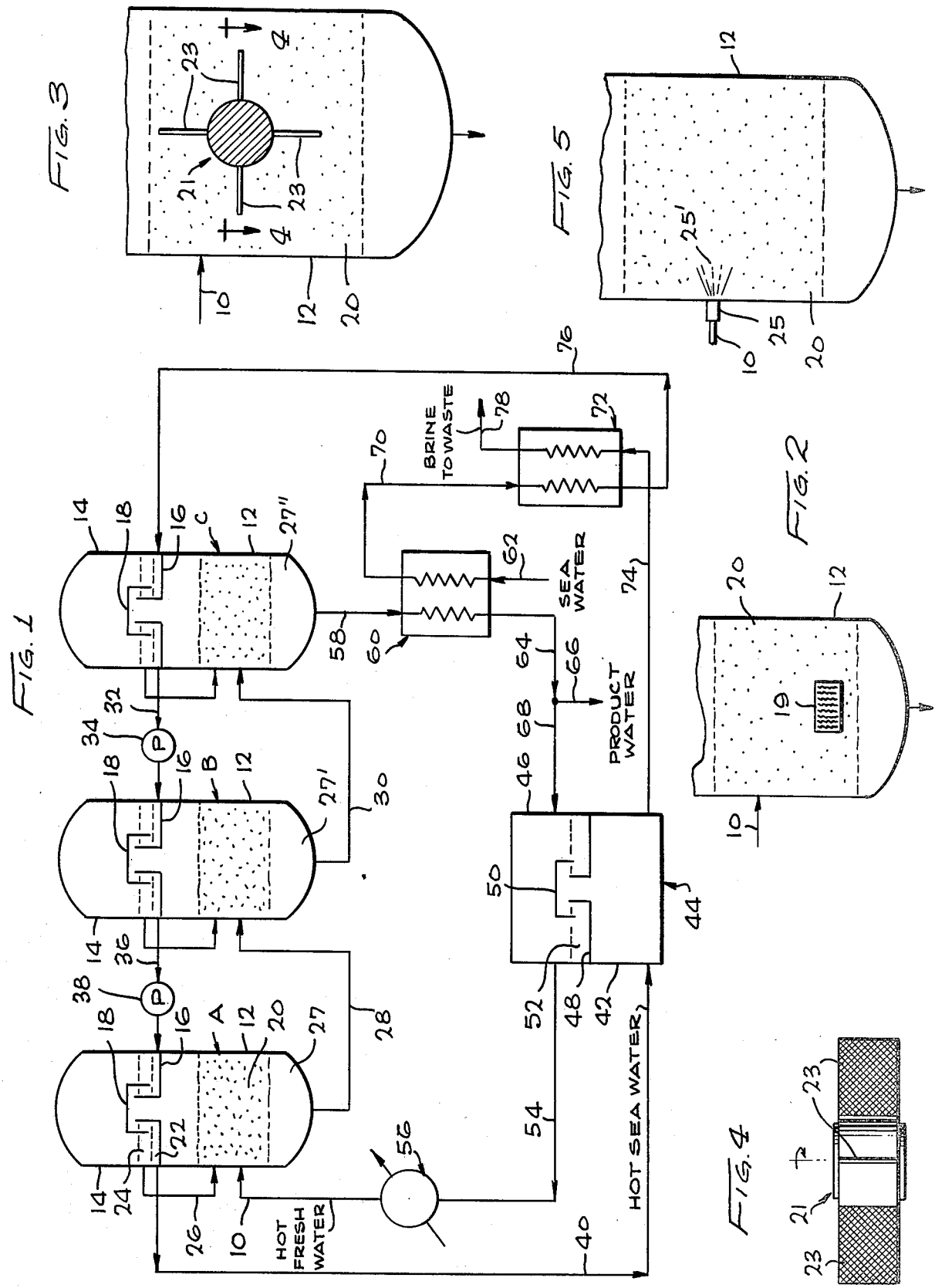

PROCESS OF DESALINATION BY DIRECT CONTACT HEAT TRANSFER

BACKGROUND OF THE INVENTION

1. Field of the Invention

This invention relates to an efficient process for desalination of salt water, particularly sea water, and production of fresh water. The invention is particularly concerned with a process and system of the above type for recovery of fresh water from salt water or sea water by direct contact heat transfer between hot water and an immiscible liquid, particularly a liquid hydrocarbon of low vapor pressure, to cause boiling thereof, and effecting direct contact heat transfer between the vapor of such immiscible liquid and the salt water to condense such vapor and heat the salt water, employing an arrangement of staged evaporator-condenser units for carrying out such boiling and condensation operations, and utilizing the heated salt water to generate fresh water.

2. Prior Art

Desalination is a growing industry in many parts of the world. Not only the countries with vast areas of arid lands, but the developed and the developing countries also are increasingly producing fresh water by desalination to meet the demands of growing population and rising standards of living.

Multi-stage flash and multi-stage evaporation are the most important processes currently in use for desalination of sea water. These processes suffer from two major disadvantages. In the first place, both require large metallic heat transfer surfaces. The cost of the heat transfer surface for these processes is about 35 to 40% of the total capital investment. Also, the corrosion and scaling of these surfaces are difficult to avoid, thus further increasing the cost by the need for replacement of corroded metallic surfaces. Secondly, the cost of energy requirements for these processes is relatively large, of the order of about $2.00 per 1,000 gallons of fresh water produced. Thus, any desalination process which eliminates, partly or wholly, the need for metallic heat transfer surface and/or requires less energy or a lower quality energy has attractive advantages.

A number of other methods and systems are also in use or being developed for desalination. These latter processes are based on the principles of vapor compression, reverse osmosis, freeze crystallization and ion exchange. All of these latter processes are relatively less attractive.

The improved processes described in the Smith U.S. Pat. Nos. 3,640,850 and 3,856,631 are based on heat transfer with direct contact between immiscible fluids. Hence these systems do not require metallic heat transfer surfaces, and such processes can operate with smaller amounts of energy per unit of water produced and with relatively low quality heat.

In the Smith patents hot sea water is flashed in a flash chamber and the water vapor generated is condensed in direct contact with fresh water. The hot fresh water is now brought in contact with a hydrocarbon liquid, which is immiscible with water. The hydrocarbon evaporates and the vapor is condensed in contact with sea water which is heated due to transport of latent heat released from the hydrocarbon vapor, and the heated sea water is heated further by an external heat exchanger. The hot sea water then enters the flash chamber. Although the use of metallic heat transfer surfaces thus is virtually eliminated, this design involves the flow of hydrocarbon and water in opposing directions and in contact with each other, the hydrocarbon following a substantially horizontal flow path between a plurality of evaporator and condenser units.

Other related but less pertinent prior art is set forth below.

The El-Roy patent, U.S. Pat. No. 3,337,421 shows a multi-stage system in which vaporized hydrocarbon is condensed by direct contact with a saline stream. However, the hydrocarbon is vaporized by indirect heat exchange.

Guptill et al in U.S. Pat. No. 3,392,089 discloses liquid-liquid heat exchange between a hot fresh water stream or condensate from a multiple effect evaporator, and a hydrocarbon stream. The heated hydrocarbon is not vaporized as it is chosen to have a high vapor pressure, and is used to transfer heat to a saline stream, by liquid-liquid heat exchange, and the preheated saline stream is fed to the multiple effect evaporator.

U.S. Pat. No. 3,446,711 discloses the condensation of steam by direct contact with a colder liquid hydrocarbon. The heated hydrocarbon is then passed in liquid-liquid exchange with a cold saline feed stream.

Woodward in U.S. Pat. No. 3,219,554 discloses liquid-liquid heat exchange between a hot fresh water stream and a hydrocarbon and between the heated hydrocarbon and an incoming saline stream. The hydrocarbon has a sufficiently high vapor pressure to preclude any significant vaporization.

U.S. Pat. No. 3,232,847 to Hoff employs a high boiling hydrocarbon which is passed counter current in liquid-liquid exchange to brine in a heating section and is used as a direct contact condensing medium for steam in a second section.

Osdor, U.S. Pat. No. 3,741,878 discloses a similar system in that a low vapor pressure hydrocarbon is used as a heat exchange medium.

It is an object of the present invention to provide an improved process and system for desalination of salt water or sea water, employing direct contact heat exchange. A further object is the provision of a process and system of the foregoing type, employing liquid-liquid direct contact heat exchange between an immiscible liquid and hot water to vaporize such liquid, and passage of such vapor into direct contact with the salt water to condense the vapor and transfer heat to the salt water. A particular object is to provide a process and system of the aforementioned type having high heat transfer coefficients due to intimate mixing between the two liquid phases, to promote boiling at low temperature differential between water and immiscible liquid or hydrocarbon, and hence improved thermal efficiency, and greater economy due to utilization of low quality energy and optimum selection of pressures in the staged system.

SUMMARY OF THE INVENTION

The invention process and system of desalination employs the basic principle of transferring heat from hot fresh water to sea water by the process of evaporation of a liquid which is immiscible with water, preferably a hydrocarbon liquid, followed by condensation of the vapor, both the evaporation and condensation being carried out in direct contact with water. Thus, the evaporation of the immiscible or hydrocarbon liquid is carried out by contacting hot fresh water with such liquid, and the condensation of the hydrocarbon vapor is carried out by contacting such vapor with sea water, to thereby heat the sea water.

The operating conditions are maintained so as to insure maximum boiling of immiscible liquid or hydrocarbon in contact with the hot water at a low temperature differential, particularly of the order of about 2°–4° F., between these two phases, and to obtain large volumetric heat transfer coefficients, ranging from about 67,000 to 156,000 Btu/ /ft$^3$(hr)(° F.), by direct contact between the immiscible phases. These advantageous conditions substantially reduce the sizes of the equipment required for a given rated capacity of desalination, and increase the operating efficiency by reducing the amount of external energy required for operation of the process.

In the present invention, a plurality of condenser-evaporator units are connected together in a staged operation. Each condenser-evaporator unit has two sections, one for evaporation and the other for condensation of immiscible liquid or hydrocarbon. The two sections are separated by a number of bubble caps. Thus, hot fresh water is introduced, preferably in the form of a jet, into the lower evaporator section of each unit, causing evaporation of the low boiling immiscible liquid or hydrocarbon and the resulting vapor passes through the bubble caps into direct contact with sea water in the upper condenser section of each unit, causing condensation of the vapor and heating of the sea water. The condensed immiscible liquid in the condenser section is then returned or recycled by gravity from the upper condenser section to the lower evaporator section.

The hot fresh water is introduced into the evaporator section of the first stage, and then successively into the evaporator sections of each subsequent stage to the last stage, the temperature of the hot water being reduced successively in each of the stages. The sea water feed is introduced first into the condenser section of the last stage of the process and passes successively to the condenser sections of each previous stage to the first stage, the temperature of the sea water increasing in each successive stage to the first stage.

Thus, the immiscible liquid or hydrocarbon medium remains static or stationary in each stage, that is, such liquid does not flow from one stage to the next as do the streams of hot fresh water and sea water, as distinguished from the process and system of the above noted Smith patents. Further, with hydrocarbon mixtures of appropriate compositions, the pressure in all stages can be maintained substantially equal even though the temperature varies from stage to stage. Equal pressures in the respective stages results in additional economic advantages.

The immiscible liquid medium is a low vapor pressure liquid having a boiling point lower than water. Preferably such immiscible liquid is an organic liquid, particularly a hydrocarbon. Such hydrocarbons can be paraffinic hydrocarbons containing from 4 to 7 carbon atoms, such as normal and branched chain butanes, normal and branched chain pentanes, normal and branched chain hexanes and normal and branched chain heptanes. Mixtures of such hydrocarbons also can be employed. Other hydrocarbons also can be utilized such as cyclohexane, benzene, mixtures thereof, and mixtures of any of the above paraffinic hydrocarbons, or hydrocarbon mixtures with benzene and cyclohexane, or mixtures of benzene and cyclohexane.

Although not preferred, immiscible liquids which are more dense than water can be employed, such as chloroform, carbontetrachloride, and dichloromonofluoromethane, provided such higher density liquids also have a boiling point lower than water.

The immiscible or hydrocarbon liquids can have a boiling range from about 60° to about 97° C. at atmospheric pressure.

Preferred immiscible hydrocarbon liquids which can be employed in the process and system of the invention are normal and branched chain pentanes, normal and branched chain hexanes, and mixtures thereof.

Fresh water can be recovered according to the invention process and system from any aqueous solution containing a nonvolatile solute, particularly salt water or sea water in which such solute is sodium chloride. Examples of other aqueous solutions which can be employed for recovery of fresh water according to the invention, include brackish waters.

Thus, the present invention is directed broadly to a process for separating water from an aqueous solution containing a non-volatile solute, e.g. sea water, by direct contact heat transfer, which comprises in each stage of a plurality of interconnected like stages, directly contacting a hot liquid, e.g. hot water, with a water immiscible liquid having a boiling point lower than such hot liquid in an evaporator zone, causing such immiscible liquid to boil, contacting the vapor of the immiscible liquid generated during such boiling with a cooler aqueous solution of a non-volatile solute in a condenser zone, causing condensation of such vapor and heating the aqueous solution by transfer of latent heat from the condensing vapor, and recycling the condensed immiscible liquid from the condenser zone to the evaporator zone.

The hot aqueous solution of a non-volatile solute, such as sea water, is withdrawn from the condenser zone of the first stage evaporator-condenser unit, and is flashed. The vapor so generated is condensed in direct contact with recycled fresh water withdrawn from the evaporator section of the last evaporator-condenser stage. The resulting recycled fresh water is thus heated by the condensing vapor, and is returned to the evaporator section of the first stage unit, after being further heated by an external energy source to supply the necessary energy of separation. A portion of the fresh water stream withdrawn from the last stage as noted above is removed as product water.

The spent and concentrated aqueous solution of non-volatile solute, e.g. brine, following flashing is removed as a waste stream.

Prior to introduction of the feed of the aqueous solution of a non-volatile solute, or sea water into the condenser section of the last stage evaporator-condenser unit, such solution preferably is passed in heat exchange relation with both the warm fresh water withdrawn from the evaporator section of the last stage unit, and with the warm spent aqueous solution or brine following flashing thereof, for recovery of any residual heat in fresh water or spent solution, to warm the aqueous feed solution or sea water.

DETAILED DESCRIPTION OF THE INVENTION

The invention will be described in greater detail below, taken in connection with the accompanying drawing wherein:

FIG. 1 is a diagrammatic flow sheet illustrating the process and system of the invention employing staged evaporator-condenser units;

FIG. 2 illustrates the use of a wire mesh in the evaporator section of the stages to promote mixing of the liquid phases;

FIG. 3 illustrates a form of wheel having wire screen paddles positioned in the evaporator section of the stages to promote mixing between the liquid phases;

FIG. 4 is a transverse section through the wheel of FIG. 3, taken on line 4—4 of FIG. 3; and FIG. 5 illustrates introduction of a jet of hot water into the evaporator section to enhance the heat transfer coefficient.

Referring to FIG. 1, hot fresh water, e.g. at a temperature of about 212° F., is introduced at 10 into the first stage unit A of a series of like evaporator-condenser units, shown as three in number, and including the two subsequent stage units B and C. It will be understood that the number of such stages or evaporator-condenser units can be varied and can be less than three or more than three, depending on the conditions of operation. Each of the evaporator-condenser units contains a lower evaporator section 12 and an upper condenser section 14, separated by an intermediate bubble cap tray 16 between the evaporator and condenser sections, the bubble cap tray 16 containing a plurality of bubble caps of the conventional type, one of which is illustrated at 18.

A body of liquid hydrocarbon, n-pentane, for example, indicated at 20, is maintained in the lower evaporator section 12 of each of the evaporator-condenser units.

Introduction of the hot fresh water into the pool of liquid n-pentane 20 in the evaporator section of the first stage unit A produces boiling of the hydrocarbon, and such boiling is maintained during continuous introduction of the hot fresh water into the unit A.

For successful operation of the invention process an essential criterion is the provision of conditions which provide intense continuous boiling of the liquid hydrocarbon in each of the stages. The intensity of boiling depends upon the intensity of mixing between the two phases. The Reynolds number with which the hot water flows into the hydrocarbon phase can be taken as a measure of the extent of such mixing. The results of experiments show that for an inlet Reynolds number of $8 \times 10^3$ the magnitude of the volumetric heat transfer coefficient is 67,000 Btu/(hr)(ft$^3$)(°F.) without any special design to promote mixing between phases.

However, by appropriate design and incorporation of certain other components and features, intimate mixing between the hot water and hydrocarbon phases to promote intense boiling can be assured. With such enhanced mixing, the magnitude of the volumetric heat transfer coefficient can be increased several times that of the value noted above. Thus, as seen in FIG. 2, the use of a wire mesh block 19 in the body of liquid hydrocarbon in the evaporator section 12 to cause heterogeneous nucleation and mixing of the two phases has been found to be favorable for promoting boiling.

As illustrated in FIGS. 3 and 4, the use of a wheel 21, particularly one having wire screen paddles 23 in the evaporator section 12, which rotates to promote turbulence and mixing of the two liquid phases when the hot water at 10 is introduced into the body of immiscible liquid or hydrocarbon 20 in the evaporator and impinges on the wheel, also promotes boiling. Pilot plant tests employing a wheel made of wire screen placed in the evaporator, as in FIGS. 3 and 4, resulted in a volumetric heat transfer coefficient as high as 156,000 Btu/(hr)(ft$^3$)(°F.) with a temperature differential ($\Delta T$) between the hot water and the hydrocarbon of about 3.5° F. Higher coefficients of heat transfer can also be obtained by introducing the hot water through a nozzle 25 in the form of a jet 25' at high velocity into the pool of hydrocarbon in the evaporator, as illustrated in FIG. 5.

The immiscible hydrocarbon vapor generated during boiling flows through the bubble caps 18 and is condensed in contact with a relatively cold layer of sea water 22 in the condenser section 14 to form a layer of hydrocarbon liquid 24 which floats on the sea water layer 22. The condensation of the hydrocarbon vapor in contact with the sea water causes the latter to become heated due to transfer of latent heat released from the condensing vapor. The thickness of the water layer 22 and the rate of flow of the water layer across the condenser should be such that substantially all of the hydrocarbon vapor bubbling through the water layer is condensed therein.

An additional amount of immiscible liquid or hydrocarbon can be added during operation for circulation between the evaporator and condenser of each stage to ensure that a hydrocarbon layer of sufficient thickness is always maintained in both chambers, particularly the evaporator. Any hydrocarbon vapor which escapes condensation in the condenser can be condensed by means of a heat exchanger (not shown). The condensed hydrocarbon, such as n-pentane, at 24 which accumulates at the top of the sea water layer 22 in each stage, is transferred back to the evaporator section 12 of the unit through a side tube 26. Although the pressure in the evaporator section 12 is usually slightly higher than that in the condenser section 14, the above noted transfer of condensed hydrocarbon liquid from the condenser section to the evaporator section through tube 26 can be achieved by maintaining a sufficient gravitational head of the hydrocarbon liquid in the condenser.

The water 27 in the bottom of the evaporator section 12 of the first stage A is transferred via line 28 to the evaporator section 12 of the next stage B and the water 27' from the bottom of the evaporator section of stage B, is transferred via line 30 to the evaporator section 12 of the last stage C. The temperature of the fresh water passing from the bottom of stage A and progressively to the evaporator sections of stages B and C, decreases monotonically from the first stage A to the last stage C due to the transfer of heat from the hot water to the boiling hydrocarbon in the evaporator sections of each of the stages. However, the temperature of the hot water entering the evaporator section 12 of the first stage A is sufficiently high, and the other conditions of operation such as amount and composition of the hydrocarbon in each stage, and the flow rate of the water from the evaporator section 12 of the first stage A to the evaporator section of the last stage C, are such that the temperature of the hot water entering the evaporator section of the last stage C is still high enough to produce boiling of the hydrocarbon therein.

In a similar manner, sea water feed in the condenser section 14 of the last stage C is transferred from such condenser section via line 32 and pump 34 to the condenser section 14 of the second stage B, and thence from the condenser section of stage B, via line 36 and pump 38 to the condenser section 14 of the first stage A. The temperature of the sea water 22 in the condenser section of each stage increases as the sea water stream flows in the above noted manner from stage C to stages B and A, the sea water leaving the condenser section of stage A having the desired high temperature due to heat transfer from the hydrocarbon vapor in each of the stages to the sea water therein. Thus, it is seen that the hot fresh water proceeds initially to the evaporator section of the first stage unit A and then progressively through the evaporator sections of the successive stages to the last stage unit C, and the relatively cool sea water feed proceeds countercurrently or in the opposite direction to the condenser section of the last stage unit C and then successively to the condenser sections of the preceding stages and finally to the first stage unit A.

Since two streams of water (fresh water and sea water) are flowing from stage to stage in opposing directions, pumps such as 34 and 38 are required for at least one of the streams. It is desirable, however, to maintain pressures in the stages A, B and C at such values as to minimize pumping energy. The pressures in the respective stages can be readily selected and optimized for a given variation in temperatures by maintaining the appropriate liquid composition of the hydrocarbon in each stage. By suitable selection of the composition of the hydrocarbon liquids in each stage, pressure in each of the stages can be made approximately equal. Such pressure can range from about 1 to about 5 atmospheres absolute. Thus, although pumps 34 and 38 are required for transferring the sea water from one stage to the preceding stage, the pumping energy required for this purpose is minimal.

Each of the other evaporator-condenser stage units B and C in the system operate in substantially the same manner as the first stage A, noted above, to provide and maintain intense boiling of the liquid hydrocarbon in the evaporator section by direct contact heat transfer from the hot fresh water to the liquid hydrocarbon, passage of the hydrocarbon vapor through the bubble caps and into direct contact with the relatively cooler sea water in the condenser section, to condense the hydrocarbon vapor and heat the sea water by transfer of latent heat of vapor condensation to the sea water, and return of condensed hydrocarbon liquid by gravity through tube 26 to the evaporator section.

The hot sea water is withdrawn from the condenser section of the first stage A and is passed via line 40 into the evaporator section 42 of a flash evaporator 44, which can be in the form of a multi-stage direct contact condenser and flash evaporator of known design, only one stage 44 of which is shown. The flash evaporator includes a condenser section 46, with a bubble cap tray 48 and bubble caps, one of which is illustrated at 50, separating the evaporator and condenser sections. The water vapor generated during flashing of the hot sea water in the evaporator section 42 passes through the bubble caps 50 and is condensed in direct contact with recycled fresh water at 52 in the condenser section. Such recycled fresh water thus becomes heated due to transfer of the latent heat released in the condensation of the water vapor. The combined stream of condensed water and fresh water at 54 is further heated in a heat exchanger 56 to supply the necessary energy of separation for the desalination, and the resulting hot fresh water at 10 is then introduced into the evaporator section 12 of the first stage unit A, as previously noted. Due to direct contact heat exchange between the phases in the stages A, B and C, boiling and condensation of immiscible liquid or hydrocarbon can occur with smaller temperature difference therebetween, and the thermal efficiency of the process is enhanced. Consequently, the heat input source illustrated by the heat exchanger 56 can employ low quality heat energy such as relatively low pressure steam. The heat exchanger 56 can be, for example, a tube-type heat exchanger wherein the recycled heated fresh water stream is passed through tubes in a jacket in countercurrent relation to steam flowing through the jacket.

The cooled fresh water at 27" in the bottom of the evaporator section 12 of the last stage unit C, and at a temperature, for example, of about 120° F., is passed via line 58 through a heat exchanger 60 to transfer any residual heat to the incoming sea water feed 62. A portion of the exiting fresh water at 64 is withdrawn as product water at 66, while the remaining portion of the fresh water is recycled via line 68 to the condenser section 46 of the evaporator-condenser 44 for flashing the hot sea water. The sea water feed 62 exiting the heat exchanger 60 is passed via line 70 through a second heat exchanger 72 in heat exchange relation with spent concentrated sea water or brine at 74 withdrawn from the flash evaporator 44. Thus, the residual heat from the flashed spent sea water is recovered by heat transfer to the incoming sea water feed. The resulting warm sea water feed exiting heat exchanger 72, at a temperature for example of about 110° F., is passed via line 76 into the condenser section 14 of the last stage evaporator-condenser unit C, and the spent brine discharged from the condenser 72 is conducted via line 78 to waste.

The arrangement of the heat exchangers and the flows of the streams 58, 62 and 74 can be varied, since the detailed heat and material balance may necessitate different arrangements of these flows to attain desired temperatures of the streams. Thus, for example, instead of introducing all of the incoming sea water feed 62 into the condenser section 14 of the last stage C, a portion of such stream may be required to be rejected after passing through heat exchanger 60 and cooling the fresh water stream coming from the evaporator section of the last stage C, in order to maintain the proper heat balance of the process.

From the foregoing, it is seen that the invention provides a simple process and system of improved performance, reliability, and efficiency for producing fresh water from an aqueous solution of a non-volatile solute, particularly from sea water or brine. The basic principles of the invention process and system for heat transfer from one fluid to a second fluid can also be employed to transfer or transport heat from geothermal and ocean brine to other fluids for various applications.

While I have described particular embodiments of my invention for purposes of illustration, it is understood that other modifications and variations will occur to those skilled in the art, and the invention accordingly is not to be taken as limited except by the scope of the appended claims.

What is claimed is:

1. A process for separating water from an aqueous solution containing a non-volatile solute, by direct contact heat transfer in a plurality of stages, each of said stages comprising a lower evaporator zone and an upper condenser zone, said process comprising in each stage thereof
   (a) directly contacting, in said evaporator zone a first hot liquid with a water immiscible second liquid having a boiling point lower than said first hot liquid, causing said immiscible second liquid to boil and generate vapor, (b) contacting the vapor of said immiscible second liquid generated during said boiling with a cooler aqueous solution of a non-volatile solute in said condenser zone, (c) causing condensation of said vapor of said second liquid and heating said aqueous solution by transfer of latent heat from the condensing vapor, (d) withdrawing condensed second liquid, and (e) recycling said condensed immiscible second liquid from said condenser zone to said evaporator zone; then (f) withdrawing said heated aqueous solution of a non-volatile solute from the condenser zone of the first stage of said plurality of stages, (g) flashing said heated aqueous solution to generate water vapor, and (h) condensing said water vapor.

2. The process as defined in claim 1, including passing said hot liquid cooled by the boiling of said immiscible liquid in said evaporator zone of the first stage of said plurality of stages, to the evaporator zone of a second stage, and introducing said cooler aqueous solution of a non-volatile solute into said condenser zone of said first stage from the condenser zone of said second stage.

3. The process as defined in claim 1, including passing said hot first liquid in said evaporator zone of the first stage of said plurality of stages, to the evaporator zone of each successive stage to the last stage for boiling of said immiscible liquid in the evaporator zone of each stage and passing said aqueous solution of a non-volatile solute as feed into the condenser zone of the last stage of said plurality of stages and then to the condenser zone of each preceding stage to the first stage, for condensing said vapor of said immiscible liquid in the condenser zone of each stage.

4. The process as defined in claim 3, wherein each stage is at substantially the same pressure.

5. The process as defined in claim 3, said first hot liquid being hot water, and including condensing said water vapor generated during said flashing with fresh water to heat same, and passing the combined heated stream of fresh water vapor and condensed water to the evaporator zone of said first stage.

6. The process as defined in claim 5, including further heating said combined heated stream prior to introduction thereof into the evaporator zone of said first stage.

7. The process as defined in claim 6, including withdrawing fresh water from the evaporator zone of the last stage of said plurality of stages, recovering a portion of said fresh water as product, employing the remainder of said fresh water for said condensing said water vapor generated during said flashing, and withdrawing the aqueous solution of non-volatile solute as waste following said flashing thereof.

8. The process as defined in claim 7, including passing a cold feed of said aqueous solution of a non-volatile solute in heat exchange relation with fresh water withdrawn from the evaporator zone of said last stage, for further cooling said water and heating said aqueous feed solution, and passing the resulting feed solution in heat exchange relation with said waste aqueous solution of a non-volatile solute to further heat said feed solution, and introducing the resulting feed solution into the condenser zone of said last stage.

9. The process as defined in claim 1, said aqueous solution of a non-volatile solute being sea water, said hot liquid being hot water, and said immiscible liquid being a hydrocarbon.

10. The process as defined in claim 7, said aqueous solution of a non-volatile solute being sea water, and said immiscible liquid being a hydrocarbon.

11. The process as defined in claim 9, said hydrocarbon being selected from the group consisting of pentane, hexane, and mixtures thereof.

12. The process as defined in claim 10, said hydrocarbon being selected from the group consisting of pentane, hexane, and mixtures thereof.

13. The process as defined in claim 1, including providing bubble caps in each of said plurality of stages, separating the evaporator zone and the condenser zone thereof, whereby the vapor of said immiscible liquid generated in said evaporator zone of each stage flows through said bubble caps and is condensed in contact with said cooler aqueous solution in the condenser zone of each of said stages.

14. A process for separating water from sea water by direct contact heat exchange in a plurality of stages, each of said stages comprising a lower evaporator zone and an upper condenser zone, and bubble cap means between and separating said evaporator zone and said condenser zone, said process comprising:

(a) introducing hot fresh water into the evaporator zone of the first stage of said plurality of stages, (b) withdrawing fresh water from the evaporator zone of the first stage and introducing it into the evaporator zone of the second stage of said plurality of stages, thereby transferring fresh water from one stage to the next succeeding stage of said plurality of stages, (c) by the method of step (b), transferring fresh water from one stage to the next succeeding stage until said fresh water reaches the last stage of said plurality of stages.

(d) withdrawing fresh water from said last stage.

(e) introducing sea water into the condenser zone of the last stage of said plurality of stages.

(f) withdrawing sea water from the condenser zone of the last stage and introducing it into the condenser zone of the second to the last stage of said plurality of stages, thereby transferring sea water from one stage to the next preceding stage of said plurality of stages.

(g) by the method of step (f), transferring sea water from one stage to the next preceding stage until said sea water reaches the first stage of said plurality of stages, (h) introducing or providing a liquid hydrocarbon in each said stage, said liquid hydrocarbon having a boiling point and a density lower than water, (i) causing said hydrocarbon to boil in the evaporator zone in each stage and generate hydrocarbon vapor by the exchange of heat by direct contact between said fresh water and said liquid hydrocarbon, (j) maintaining said hydrocarbon at its boiling point in each said evaporator zone of each stage, thereby causing said hydrocarbon vapors to flow through said bubble cap means into contact with relatively cooler sea water in the condenser zone in each such stage, (k) causing the condensation of said hydrocarbon vapors and the heating of said sea water by the direct transfer of latent heat from said hydrocarbon vapor to said water and forming a condensed hydrocarbon liquid in contact with said water, (l) recycling the condensed hydrocarbon liquid from said condenser zone to said evaporator zone in each stage, (m) withdrawing hot sea water from the condenser zone of said first stage, and (n) flashing said hot sea water to generate water vapor.

15. The process as defined in claim 33 including (i) recycling fresh water from the evaporator zone of said last stage, (ii) passing the water vapor generated during said flashing in direct contact with said recycled fresh water and condensing said water vapor, and heating said fresh water, (iii) passing the combined stream of condensed water and fresh water into a heat exchanger for further heating said combined stream, and (iv) introducing said further heated combined stream into the evaporator zone of said first stage.

16. The process as defined in claim 15, including passing said recycled fresh water first into heat exchange relation with said sea water feed, for heating same, withdrawing a portion of the resulting fresh water stream as product and employing the remaining portion of said recycled water for condensing said water stream vapor generated during said flashing, passing the resulting heated sea water feed in heat exchange relation with the sea water following flashing thereof, for further heating said sea water feed, prior to introduction thereof into the condenser zone of said last stage.

* * * * *